United States Patent [19]
Shannon

[11] 3,780,225
[45] Dec. 18, 1973

[54] TACTILE COMMUNICATION ATTACHMENT

[76] Inventor: Thomas D. Shannon, 486 Broadway, New York, N.Y.

[22] Filed: Jan. 3, 1972

[21] Appl. No.: 214,892

[52] U.S. Cl.............. 179/2 A, 179/2 DP, 340/407
[51] Int. Cl. ........................................... H04m 1/21
[58] Field of Search.................... 128/2 S, 2.05 C, 128/2.05 D, 2.05 P; 200/81 H, 83 Q, 83 Z, 200/86 A; 340/407; 179/2 R, 2 A, 103

[56] References Cited
UNITED STATES PATENTS

| | | | |
|---|---|---|---|
| 2,972,140 | 2/1961 | Hirsch................................. | 340/407 |
| 3,535,067 | 10/1970 | Lesher et al..................... | 128/2.05 P |
| 3,414,676 | 12/1968 | Long.................................. | 179/2 A |
| 3,046,369 | 7/1962 | Hicks................................ | 200/83 R |

OTHER PUBLICATIONS

IBM Technical Disclosure Bulletin, "Portable Blood Pressure Monitor," L. J. Fiegel, Vol. 9 No. 6, November 1966, page 558

*Primary Examiner*—William C. Cooper
*Assistant Examiner*—Randall P. Myers

[57] ABSTRACT

A tactile communication device including a responsive grip attachment and a control unit which are electro-mechanical in operation and are intended to be used at least in pairs, to establish or permit tactile communication between two or more parties. The two devices form a closed loop feedback control system whose output to each party is the pressure and volume variations of the responsive grip attachment experienced by both parties.

13 Claims, 3 Drawing Figures

TACTILE COMMUNICATION ATTACHMENT

This invention relates to a method and apparatus for permitting tactile communications in addition to or instead of audible communication between two or more people via, for example, telephone lines or other communication systems.

The present invention is particularly applicable for use by persons who are deaf, deaf mutes and/or dumb, to carry on communications with another person who may also be deaf, a deaf mute or dumb, by or through an established system of communication using the sense of touch. The invention also permits a person to convey to another person the emotions which are sensed during a conversation, via the same sense of touch. While the above may be the principal application for the invention, it will be apparent from the description below that the apparatus and method of the invention can be used to convey intelligence in the sense of touch over long distances and in various different forms and applications.

In particular, the apparatus of the invention comprises a tactile communication device including a responsive grip attachment and a control unit which are electro-mechanical in operation and are intended to be used at least in pairs, to establish or permit tactile communication between two or more parties. The two devices form a closed loop feedback control system whose output to each party is the pressure and volume variations of the responsive grip attachment experienced by both parties.

In the illustrated embodiment, the pressure and volume variations are provided by means of a fluid-filled device in the form of a sleeve or pad which is wrapped around a telephone hand set. A length of flexible tubing connects the sleeve to a control unit located nearby, and the latter includes a compressible reservoir or fluid, hereinafter referred to as a bellows, coupled to a solenoid. When the sleeve is to be expanded or the pressure is to be increased, an electrical current is applied to the solenoid which attempts to compress the bellows. The magnitude of the solenoid current is proportional to the degree to which the two parties oppose each other's grip on the sleeves.

A compression at one end of the phone line causes an increase in pressure and/or expansion at the other end. Similarly, any opposition to that expansion causes an increase in pressure at both ends. The overall effect is that both parties continually experience each other's grip. A relaxing of one's grip is reflected as a "going limp" at the other end.

This variation in pressure and volume can be used to establish a form of tactile communication, using the sense of touch. While disclosed in a telephone system, it will be appreciated that the device can be connected in any form of two-way communication system using, for example, microwave or shortwave bands and the like. If one or both parties is a deaf mute or either deaf or dumb, communications can be carried on between the parties, by arranging a system or code based on the feel of the responsive grip. Alternatively, these pressure variations can be used for tactile communication in addition to or instead of audible communication, or to operate or activate other apparatus for various different purposes.

It is therefore an object of the present invention to provide a method and apparatus for permitting tactile communications between two or more people.

A further object is to provide an apparatus which can be easily coupled to a communication system such as a telephone, for permitting tactile communications in addition to or instead of audible communication.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
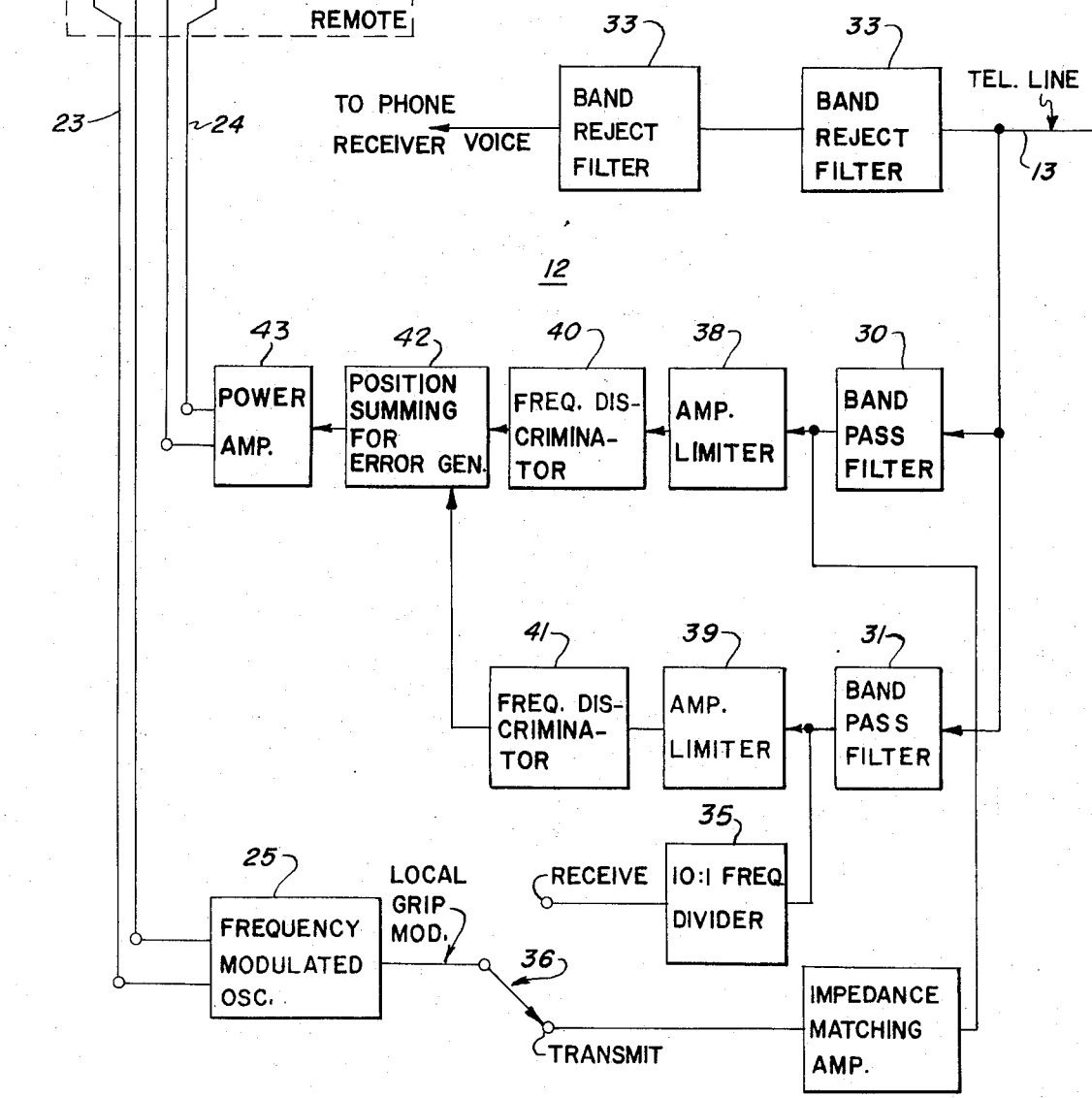
FIG. 1 is a diagrammatic illustration of the tactile communication device.

Referring now to the drawings, in FIG. 1 there is illustrated a tactile communication device exemplary of the invention including a responsive grip telephone attachment in the form of a fluid-filled sleeve 11 affixed to a telephone hand set 10 and a control unit 12 which when coupled to a telephone line 13 and another such device coupled to the telephone line 13, permits tactile communications in addition to or instead of audible communications between two parties via the telephone line 13. The telephone, including the telephone hand set 10, can be of standard construction, with the sleeve 11 affixed thereto. The latter is a fluid-filled, sealed, compressible sleeve affixed about the grip portion of the telephone hand set 11 in appropriate fashion, and coupled to a bellows 15 by means of a fluid line 16. The bellows 15 comprises part of an actuator unit 14 of the control unit 12 and is remotely located with respect to the telephone hand set 10. In addition, the actuator unit 14 can be remotely located with respect to the other electrical apparatus forming the control unit 12, and can be electrically coupled to the latter by means of the electrical conductor wires 23 and 24. This actuator unit 14, as explained more fully below, can be affixed to the telephone hand set 11, if desired. The electrical apparatus forming the control unit 12 therefore can be placed in any convenient location hidden from sight, and the actuator unit 14 can be located nearer to the telephone hand set 10, thus permitting a shorter length of fluid line 13 to be used to couple the sleeve 11 to the bellows 15. It is preferred that a fluid line 16 as short as possible be used, since the shorter fluid line requires less fluid to be moved to actuate the bellows 15 and/or the sleeve 11. The system sensitivity therefore is enhanced.

The sleeve 11 and its associated bellows 15 are used to control a frequency modulated oscillator 25, to generate positional information signals which are transmitted over the telephone line 13, together with the voice frequency signals, and used to actuate the bellows 15 and sleeve 11 of another tactile communication device coupled to the telephone line, through the medium of the telephone central office equipment. These positional information signals are converted in the control unit 12 and used to generate solenoid currents for operating a solenoid 18 (shown schematically) coupled to the bellows 15 to vary the pressure and volume of the sleeve 11, to produce a signal detectable by the party holding the telephone hand set 10, through the sense of touch.

To generate the proper and identical solenoid currents in each control unit 12, two frequency modulated signals are used. The two center frequencies for the signals are 290 HZ and 2,900 HZ. The intended frequency range of each signal is from 10 percent below to 10 percent above the center frequency. The actual frequency transmitted at any instant is determined strictly by the position of the solenoid plunger 19 which is mechanically linked to a movable slug 28 in a frequency determining inductor 29 of the frequency modulated oscillator 25. Different positions of the slug 28 produce different values of inductance and hence different frequencies. Compressing the sleeve 11 will force fluid into the bellows 15 which will pull the plunger 19 outward from the solenoid 18. The plunger 19 will move the slug in such a direction that the oscillator frequency decreases.

The positional information signals generated by the oscillator 25 pass through an appropriate band pass filter which, in the case of the upper frequency band, is the band pass filter 30 and, in the case of the lower frequency band is the band pass filter 31, before being coupled to and sent over the telephone line 13. The voice signals are passed through two band reject filters 32 and 33 to prevent voice frequency components from interfering with the positional information signals.

The oscillator 25 for both parties generate positional information signals in the upper frequency band, however, in one of the control units 12 this signal is converted to the lower frequency band by pulsing a frequency divider in the form of a decade counter 35 whose output is a square wave of exactly one-tenth the frequency of its input. Since this square wave output passes through the band pass filter 31, only the sinusoidal frequency component is coupled to the telephone line 13. Other methods could be used to generate the low frequency signal, but this method yields an exact frequency division factor rather than one subject to variations due to component tolerances. The decision of which party sends at the higher frequency and which at the lower frequency is determined automatically by means of an electronic switch 36, which, for simplicity, is shown as a manually operated switch, when one person initiates a call and the other answers. In the illustrated example, the party who initiates or transmits a call will send at the higher frequency and the party who receives the call will send at a lower frequency.

In each control unit 12, both the upper and lower frequency band positional information signals are processed in the same way. These signals enter an amplitude limiter 38 or 39, depending on the signal band, wherein they are first amplified and then clipped to generate or produce a fixed amplitude square wave of exactly the same frequency for a wide range of signal strengths at the input. This square wave is coupled to a frequency discriminator 40 or 41 which generates an output signal whose magnitude varies directly with frequency. Specifically, in the illustrated example, the frequency discriminator 40 or 41 generates one fixed amplitude and duration pulse for each cycle of the input signal. Thus, as frequency increases, the average DC voltage of the train of output pulses increases. The pulses for the upper frequency signal are one-tenth as wide as the lower frequency pulses but, of course, are ten times as many in number. Accordingly, if the upper and lower band signals are both at their center frequencies, the DC component of both pulse trains are equal.

The pulse train outputs from both of the frequency discriminators 40 and 41 (representing the pulse train outputs from the calling and called stations) are coupled to an error generating circuit 42 which filters out a voltage that is proportional to the DC value of the sum of these two inputs. A fixed DC voltage equal to the sum when both signals are at their center frequencies is substracted from the actual sum to generate the error signal. Accordingly, when both position signals actually are at their center frequencies, the error is 0. The current to drive the solenoid coil 20 is derived by simply amplifying, by means of a power amplifier 43, this error signal so, in this case, the solenoid current is also 0. If one signal decreases in frequency by some percentage, the same percentage increase signal will cause the error to again be 0. But, if the second party prevents its frequency from increasing by The same percentage (by resisting the motion of his sleeve 11), then an error signal will occur whose magnitude is proportional to the difference between the percentage change that should occur and the percentage change allowed to occur. The error can be brought to 0 either by the first party relaxing his grip on the sleeve 11 to reduce the required percentage change, or by the second party relaxing his grip on the sleeve 11 and so allowing the required percentage change to occur.

Figure 2:
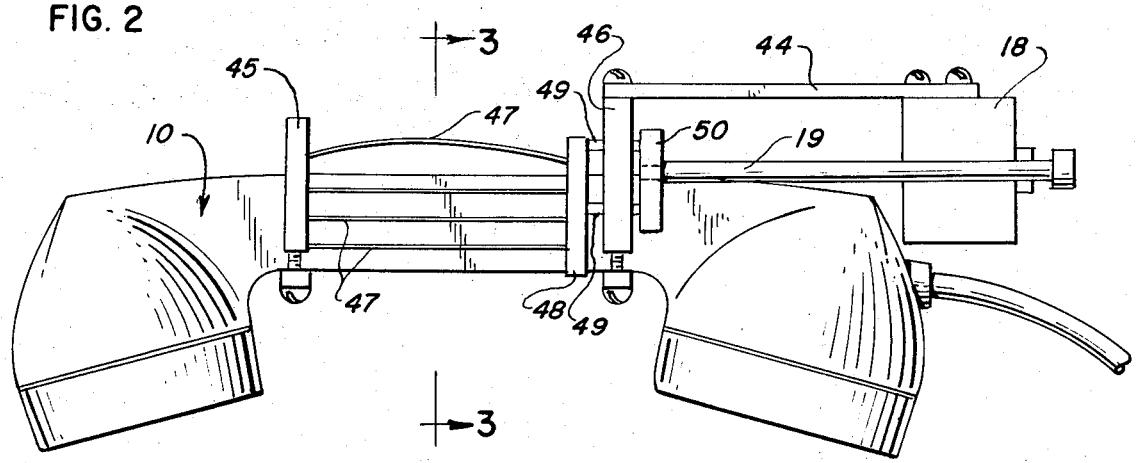
FIG. 2 is a side plan view of a responsive grip telephone attachment exemplary of a second embodiment of the invention, shown affixed to a telephone hand set.
Figure 3:
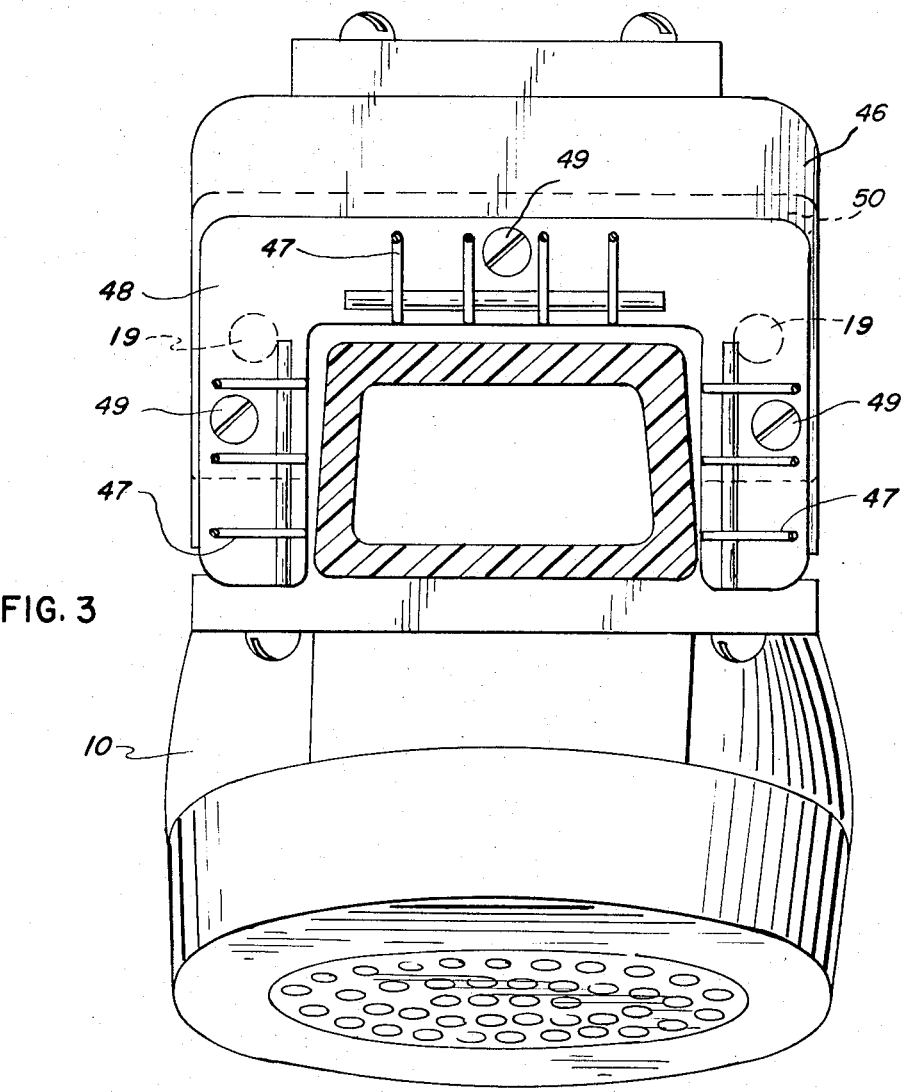
FIG. 3 is a sectional view taken along lines 3—3 of FIG. 2.

Referring now to FIG. 2 and FIG. 3, an alternate construction for the responsive grip telephone attachment is illustrated, and it can be seen that the same includes a pair of mounting brackets 45 and 46 for removably affixing it to the telephone hand set 10. The solenoid 18, in this case, is affixed to the telephone hand set 10, and is supported thereon by means of a support bracket 44 affixed to the mounting bracket 46. The sleeve 11 is replaced by means of spring wires 47 which are affixed at their one end to the mounting bracket 45 and at their other end to a slide 48. The slide 48 is slidably supported by means of shafts 49 extending through the mounting bracket 46 and affixed to an actuating plate 50. The plunger 19 of the solenoid 18 is affixed to the actuating plate 50. The power amplifier 43 is coupled to the solenoid 18, via the electrical conductor wires 24. The plunger 19 of the solenoid 18 again is mechananically linked to the movable slug 28 (not shown) in the frequency determining inductor 29 (not shown) of the frequency modulated oscillator 25.

The operation of this pressure grip telephone attachment is the same as that described above, however, in this case, the spring wires 47 when squeezed exert a force on the slide 48 to move the latter, which force is coupled to the actuator plate 50 and hence the plunger 19 of the solenoid 18. Conversely, upon energizing the solenoid 18, its plunger 19 transmits the pressure to the actuator plate 50, the slide 48 and the wires 47, to provide pressure variations, in the manner described above.

In addition to the above-disclosed methods for producing the pressure and volume variations, other methods can be used. For example, the system can be retained, and the position to frequency conversion can be accomplished using a variable resistor which causes a voltage change which, in turn, would determine the frequency of a voltage controlled oscillator. A variable capacitor also can be used. The use of the pressure sleeve 11, however, is preferred, because of the advantages in simplicity: freedom from friction, backlash, and other mechanical functions; and sensitivity appropriate to the requirements. The selection of 290 and 2,900 HZ for the center frequencies of the positional information signals is made for ease of isolating the tones and voice frequencies, yet keeping all electrical signals within assured transmission bands of conventional systems. The percentage modulation (or frequency deviation) is selected to provide the most efficient type of operation, in that a very narrow deviation places more stringent requirements on sensitivity and stability of the detection circuits. A very wide deviation, on the other hand, would tend to spread into frequencies desired for voice information or into frequencies where telephone line transmission is poor.

Also, the frequency discriminators 40 and 41 can be a tuned discriminator of the inductive-capacitance type used typically in FM receivers. However, for the low frequencies used here, the pulse or digital discriminator has advantages in size of components, cost and sensitivity. Furthermore, the selection of direction of frequency change with position is one of convenience. All directions could be reversed and the system would function identically.

From the above description, it can be seen that a tactile communication device which can be easily and quickly connected in any two-way communication system, such as a telephone, is provided which will permit two parties to have a method of tactile communication in addition to or instead of audible communication.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A tactile communication device which when used in pairs and coupled into a two-way communication system permits tactile communication between two stations via said communication system comprising, in combination: pressure grip means; and a control unit coupled to said pressure grip means and into said communication system, said control unit comprising positional information signal generating means having an output frequency coupled into said communication system for generating positional information signals, said positional information signal generating means being operated by said pressure grip means and the output frequency thereof being varied in accordance with the pressure exerted by a person at said station on said pressure grip means; position summing means operated by said pressure grip means; first and second frequency discriminator means for receiving positional information signals from another station in said communication system and from said positional information signal generating means respectively and providing an output signal whose magnitude varies directly with frequency, the output signals of said first and second frequency discriminating means both being coupled to said position summing means and the latter providing an output signal whose magnitude is proportional to the difference between said two positional information signals to thereby increase or decrease the pressure of said pressure grip means.

2. The tactile communication device of claim 1, wherein said pressure grip means comprises a fluid-filled compressible member.

3. The tactile communication device of claim 1, wherein said control unit comprises an actuator unit including a solenoid having a plunger, a bellows affixed to said plunger and coupled to said pressure grip means, said pressure grip means comprising a fluid-filled compressible member, said positional information signal generating means comprising a frequency modulated oscillator including a frequency determining inductor having a movable slug affixed to said plunger, whereby said movable slug is moved by said plunger when pressure is exerted upon said fluid-filled compressible member to vary the frequency of said frequency modulated oscillator.

4. The tactile communication device of claim 1, wherein said positional information signal generating means generates positional information signals in a high or a low frequency band depending upon which of said two stations initiates a call, the output frequency thereof in said high and low frequency bands being varied in accordance with the pressure exerted by a person on said pressure grip means.

5. The tactile communication device of claim 1, wherein said positional information signal generating means comprises a frequency modulated oscillator having a center frequency, said pressure grip means being operable to vary the frequency range of the output signal comprising said positional information signals within an established percentage range below and above said center frequency to provide said high frequency band.

6. The tactile communication device of claim 5, wherein said positional information signal generating means further comprises frequency divider means adapted to be coupled to said frequency modulated oscillator to provide instead of said high frequency band a low frequency band having a center frequency, whereby said pressure grip means is operable to vary said low frequency band within an established range below and above said center frequency.

7. The tactile communication system of claim 6, wherein said frequency modulated oscillator comprises a frequency determined inductor having a movable slug for varying the output frequency thereof, and wherein said pressure grip means is coupled to and operable to move said slug, to thereby cause said frequency modulated oscillator to generate an output signal proportional to the pressure exerted on said pressure grip means.

8. The tactile communication device of claim 7, wherein said control unit comprises an actuator unit including a solenoid having a plunger, a bellows affixed to said plunger and coupled to said pressure grip means, said pressure grip means comprising a fluid-filled compressible member operable upon having pressure exerted thereto to operate said bellows to move said plunger, said movable slug being coupled to said plunger and moved thereby to vary the frequency of said frequency modulated oscillator.

9. The tactile communication device of claim 8, wherein said position summing means is coupled to and operable to operate said solenoid to move said plunger.

10. The tactile communication device of claim 1, wherein said two-way communication system comprises a telephone system including a telephone line and a telephone at each of said stations, and wherein said control unit further includes band pass filter means coupled between the output of said positional information signal generating means and said telephone line, and band reject filter means coupled between said telephone line and said telephone, whereby voice signal frequency components are prevented from interfering with said positional information signals.

11. The tactile communication device of claim 1, wherein said pressure grip means comprises spring means coupled to a slide actuator for moving said slide actuator in accordance with the pressure exerted on said spring means, the movement of said slide actuator being coupled to said positional information signal generating means and operating the latter to vary the output frequency thereof.

12. The tactile communication device of claim 11, wherein said positional information signal generating means comprises a frequency modulated oscillator including a frequency determining inductor having a movable slug for varying the frequency of said oscillator, a solenoid having a plunger having one end thereof coupled to said slide actuator and the other end thereof coupled to said movable slug, whereby pressure exerted on said spring means is operable to vary the frequency of said oscillator.

13. The tactile communication device of claim 12, wherein said position summing means is coupled to and operable to operate said solenoid to move said plunger.

\* \* \* \* \*